United States Patent Office.

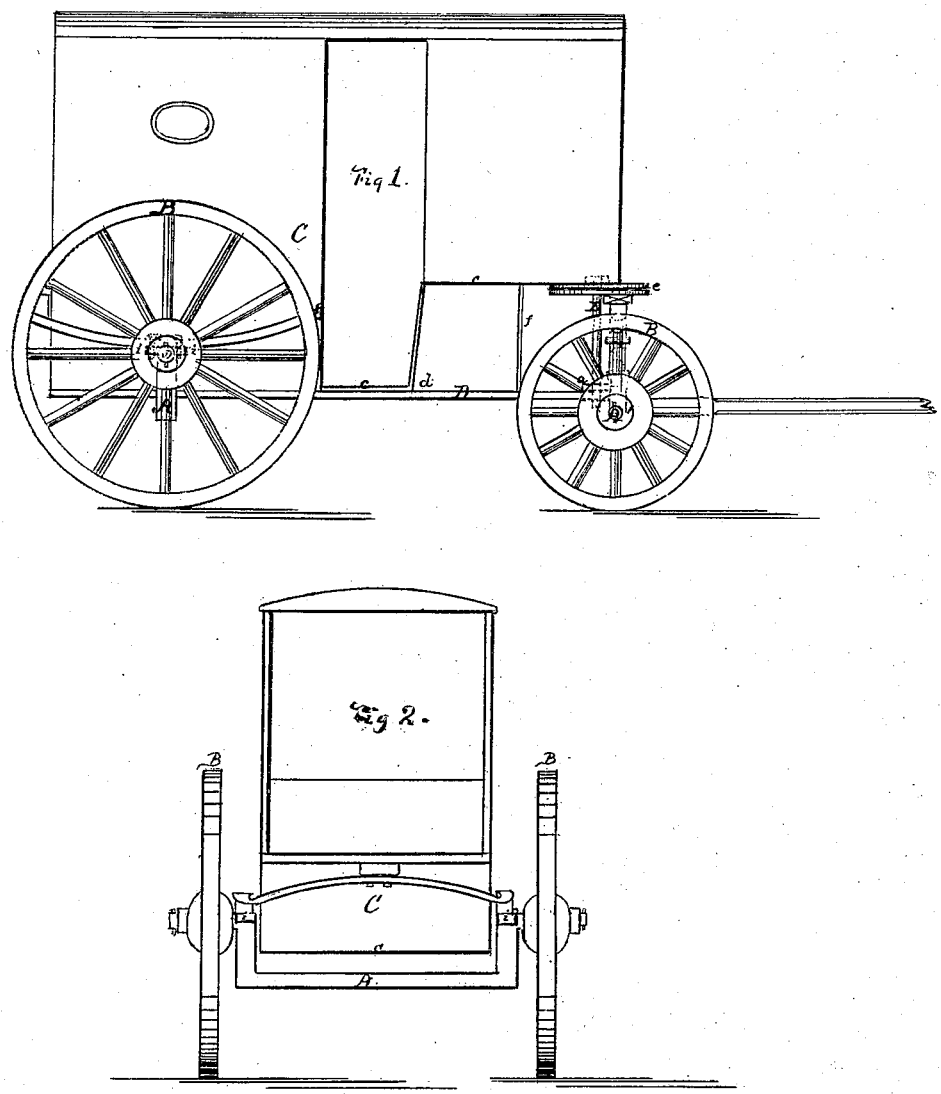

BENJAMIN B. GUDGE, OF CHICAGO, ILLINOIS.

Letters Patent No. 108,780, dated November 1, 1870.

IMPROVEMENT IN MILK-WAGONS.

The Schedule referred to in these Letters Patent and making part of the same.

I, BENJAMIN B. GUDGE, of Chicago, in the county of Cook and State of Illinois, have invented certain Improvements in Milk-Wagons, of which the following is a specification.

Milkmen and others, who have frequent occasion to be getting in and out of their wagons, find the height of the wagon-body from the ground in ordinary wagons a source of great inconvenience.

The principal object of my invention is to remedy this inconvenience; and

My invention consists in a wagon of novel and peculiar construction adapted especially for the use of milkmen and other itinerent venders, as will presently more fully appear in the accompanying drawing, which, with the letters of reference marked thereon, forms a part of this specification.

Figure 1 represents a side elevation of my invention.

Figure 2, an end or rear elevation of same.

General Description.

A is the rear axle, and
A', the front axle.
B B are the wheels.

C is the wagon-body, the floor or bottom $c$ of which is made of a novel form, being lower behind than in front.

The rear portion swings low and near the ground, but abruptly rises at the point $d$ until it reaches the height of ordinary wagon-beds, as will be clearly understood by reference to fig. 1.

D is the reach, which greatly differs from ordinary reaches in that it is rigidly attached to the lower portion of the wagon bottom, being, in point of fact, framed therein, and forming for the rear part thereof one of the timbers of the rear portion of the wagon bottom; but it is not attached to the rear axle, as ordinary reaches are.

From the point $d$ the said reach proceeds, free of the wagon-body, to a point just in rear of the front axle, where it pivots to a lug, $a$, which extends rearward from the said front axle.

E is a king-bolt, which passes down through the wagon bottom, the plates $e$ of the fifth wheel, and through the lug $a$ to the reach, to which it is attached by any ordinary means, so that the said lug $a$ and bottom plate of the fifth wheel may turn loosely upon the king-bolt, but so that the reach will be firmly secured to the king-bolt there.

The rear axle A is cranked or bent at an angle at a short distance from the hubs of the wheels, so that it passes under the lower portion of the wagon body, while the said body is suspended by ordinary springs bearing upon the said axle at the straight portion thereof, near the hubs, and immediately over the vertical part of the bent or cranked axle. This portion of the axle A is flanged to the front and rear, to form a bearing for the said springs. These flanges are shown in dotted lines at $i$ $i$.

I may dispense with spring-clips entirely, and secure the spring by bolts passing through it and through the flanges $i$ $i$.

It will be observed that the front axle and the spring above it do not rest immediately under the center of the fifth wheel, and that the king-bolt does not pass through the axle, but through the lug $a$, extended to the rear thereof, so that the front axle is eccentric to the said king-bolt when the wagon is turning.

A brace, $f$, passes from the reach D to a point above upon the wagon-body, so as to secure the said reach rigidly and prevent strain.

Claims.

Having thus described my invention,

What I claim, and desire to secure by Letters Patent, is—

1. The wagon-body C, made lower in the rear, and of the ordinary height in front for the turning of the front wheels thereunder, in combination with the cranked axle A, for the purpose of bringing the wagon-box low and at the same time to admit the wheels to pass beneath, as specified.

2. The wagon-bed or body C, of the different heights specified, having the reach attached rigidly to the rear part thereof, and said reach extending forward, and pivoted to a lug, $a$, in rear of the front axle.

3. The spring, when secured to the sides of the wagon-box, and resting on the crank-axle, as described, so that the wagon-box can rest on springs, and still be let quite down to the axle, as specified.

4. The combination of the reach D, king-bolt E and fifth-wheel $e$, when constructed and arranged as set forth and shown.

BENJAMIN B. GUDGE.

Witnesses:
LEWIS L. COBURN,